(12) United States Patent
Jing et al.

(10) Patent No.: US 12,481,123 B2
(45) Date of Patent: Nov. 25, 2025

(54) FAST-FOCUSING ZOOM CAMERA MODULE FOR PERISCOPE USE AND ELECTRONIC DEVICE HAVING THE SAME

(71) Applicant: TRIPLE WIN TECHNOLOGY(SHENZHEN) CO.LTD., Shenzhen (CN)

(72) Inventors: Zhuang-Zhuang Jing, Tianjin (CN); Jing-Wei Li, Guangdong (CN); Shin-Wen Chen, New Taipei (TW)

(73) Assignee: TRIPLE WIN TECHNOLOGY(SHENZHEN) CO.LTD., Shenzhen (CN)

(*) Notice: Subject to any disclaimer, the term of this patent is extended or adjusted under 35 U.S.C. 154(b) by 580 days.

(21) Appl. No.: 17/890,465

(22) Filed: Aug. 18, 2022

(65) Prior Publication Data
US 2023/0228971 A1   Jul. 20, 2023

(30) Foreign Application Priority Data
Jan. 20, 2022   (CN) .......................... 202210068440.5

(51) Int. Cl.
*G02B 7/08*   (2021.01)
*G02B 7/28*   (2021.01)
(Continued)

(52) U.S. Cl.
CPC .............. *G02B 7/282* (2013.01); *G02B 7/08* (2013.01); *G03B 13/36* (2013.01); *G03B 30/00* (2021.01)

(58) Field of Classification Search
CPC ...... G02B 7/282; G02B 7/08; G02B 13/0065; G02B 13/009; G02B 7/04; G02B 23/08;
(Continued)

(56) References Cited

U.S. PATENT DOCUMENTS

| 10,197,762 B2 * | 2/2019 | Park .................... G02B 27/646 |
| 2007/0177052 A1 * | 8/2007 | Yamamoto ............. H04N 23/50 348/E5.025 |

(Continued)

FOREIGN PATENT DOCUMENTS

| CN | 112653809 | 4/2021 |
| CN | 213522044 U | 6/2021 |
| CN | 215300727 | 12/2021 |

*Primary Examiner* — Bumsuk Won
*Assistant Examiner* — John Curtis Sipes
(74) *Attorney, Agent, or Firm* — ScienBiziP, P.C.

(57) ABSTRACT

A fast-focusing zoom camera module with precise and high-speed autofocus function includes a reflecting assembly, a lens assembly, and a light sensing assembly, the lens assembly is arranged between the reflecting assembly and the light sensing assembly. The reflecting assembly comprises a reflecting member and a first actuator, the first actuator driving the reflecting member to rotate around a second direction. The lens assembly comprises a lens member and a second actuator, the second actuator drives the lens member to move along a first direction. The light sensing assembly comprises a first circuit board, a sensor, and a third actuator, the sensor is electrically connected to the first circuit board, the third actuator drives the sensor to move along a third direction. The first direction, the second direction, and the third direction are perpendicular to each other.

14 Claims, 11 Drawing Sheets

(51) Int. Cl.
*G03B 13/36* (2021.01)
*G03B 30/00* (2021.01)

(58) Field of Classification Search
CPC .......... G03B 13/36; G03B 30/00; G03B 3/10; G03B 5/00; G03B 17/17; H04M 1/0264
See application file for complete search history.

(56) References Cited

U.S. PATENT DOCUMENTS

| | | | | |
|---|---|---|---|---|
| 2008/0079829 | A1* | 4/2008 | Choi | H10F 39/804 |
| | | | | 348/294 |
| 2015/0286033 | A1* | 10/2015 | Osborne | G03B 3/10 |
| | | | | 348/345 |
| 2015/0316748 | A1* | 11/2015 | Cheo | G02B 7/005 |
| | | | | 359/694 |
| 2020/0174270 | A1* | 6/2020 | Enta | G02B 27/646 |
| 2021/0080807 | A1* | 3/2021 | Sharma | G03B 13/36 |
| 2021/0136261 | A1* | 5/2021 | Lee | G03B 30/00 |
| 2021/0389551 | A1* | 12/2021 | Jang | G03B 30/00 |
| 2022/0057694 | A1* | 2/2022 | Park | G03B 30/00 |
| 2022/0214520 | A1* | 7/2022 | Son | G02B 13/0065 |

* cited by examiner

FAST-FOCUSING ZOOM CAMERA MODULE FOR PERISCOPE USE AND ELECTRONIC DEVICE HAVING THE SAME

FIELD

The subject matter herein generally relates to image capturing, and more particularly, to a fast-focusing zoom camera module for periscope use with plurality of actuators, and to an electronic device having the fast-focusing zoom camera module.

BACKGROUND

A periscope-type zooming camera with autofocusing function and optical imaging stabilization function may have multiple actuators, such as voice coil motors or optical image stabilizers. The actuators must be used for driving a lens member of the camera to move in either two directions or three directions, and these movements decrease an autofocusing speed and precision.

BRIEF DESCRIPTION OF THE DRAWINGS

Many aspects of the disclosure can be better understood with reference to the following drawings. The components are not necessarily drawn to scale, the emphasis instead being placed upon clearly illustrating the principles of the disclosure.

DETAILED DESCRIPTION

Figure 1:
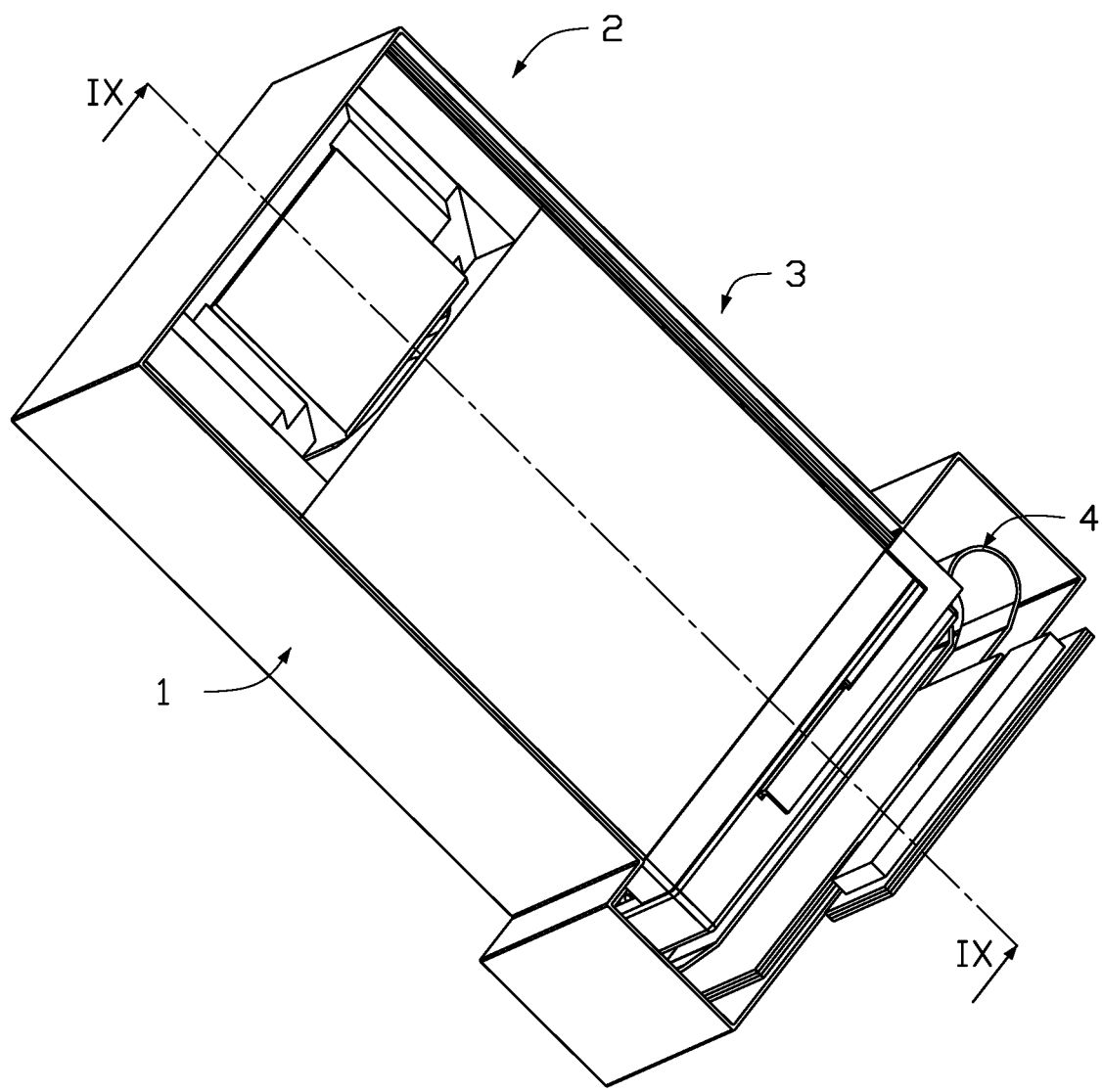
FIG. 1 is a diagrammatic view of a fast-focusing zoom camera module according to an embodiment of the present disclosure.

It will be appreciated that for simplicity and clarity of illustration, where appropriate, reference numerals have been repeated among the different figures to indicate corresponding or analogous elements. In addition, numerous specific details are set forth to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

Figure 2:
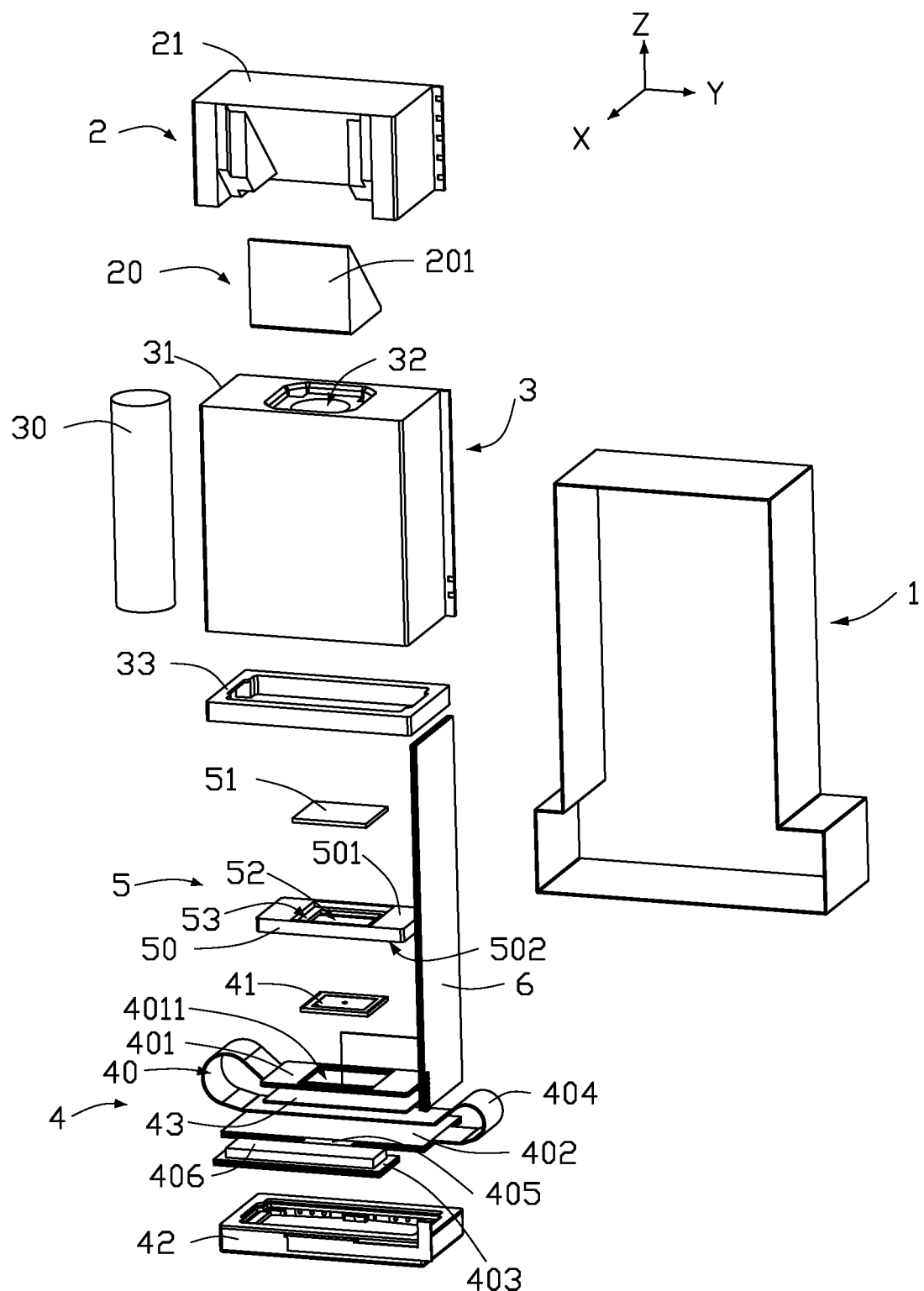
FIG. 2 is an exploded view of the fast-focusing zoom camera module of FIG. 1.

Referring to FIGS. 1 and 2, an embodiment of a fast-focusing zoom camera module 100 is provided. The camera module 100 includes a casing 1, a reflecting assembly 2, a lens assembly 3, and a light sensing assembly 4. The lens assembly 3 is connected between the reflecting assembly 2 and the light sensing assembly 4. The reflecting assembly 2, the lens assembly 3, and the light sensing assembly 4 are disposed within the casing 1. The reflecting assembly 2 reflects light rays towards the lens assembly 3, the lens assembly 3 focuses the reflected light rays to form an image onto the light sensing assembly 4, and the light sensing assembly 4 converts the light rays into a digital signal.

Referring to FIG. 2, a first direction Z is defined as an optical axis of the lens assembly 3, a second direction Y is defined as being perpendicular to the first direction Z, and a third direction X is defined as being perpendicular to both the first direction Z and the second direction Y.

Figure 9:
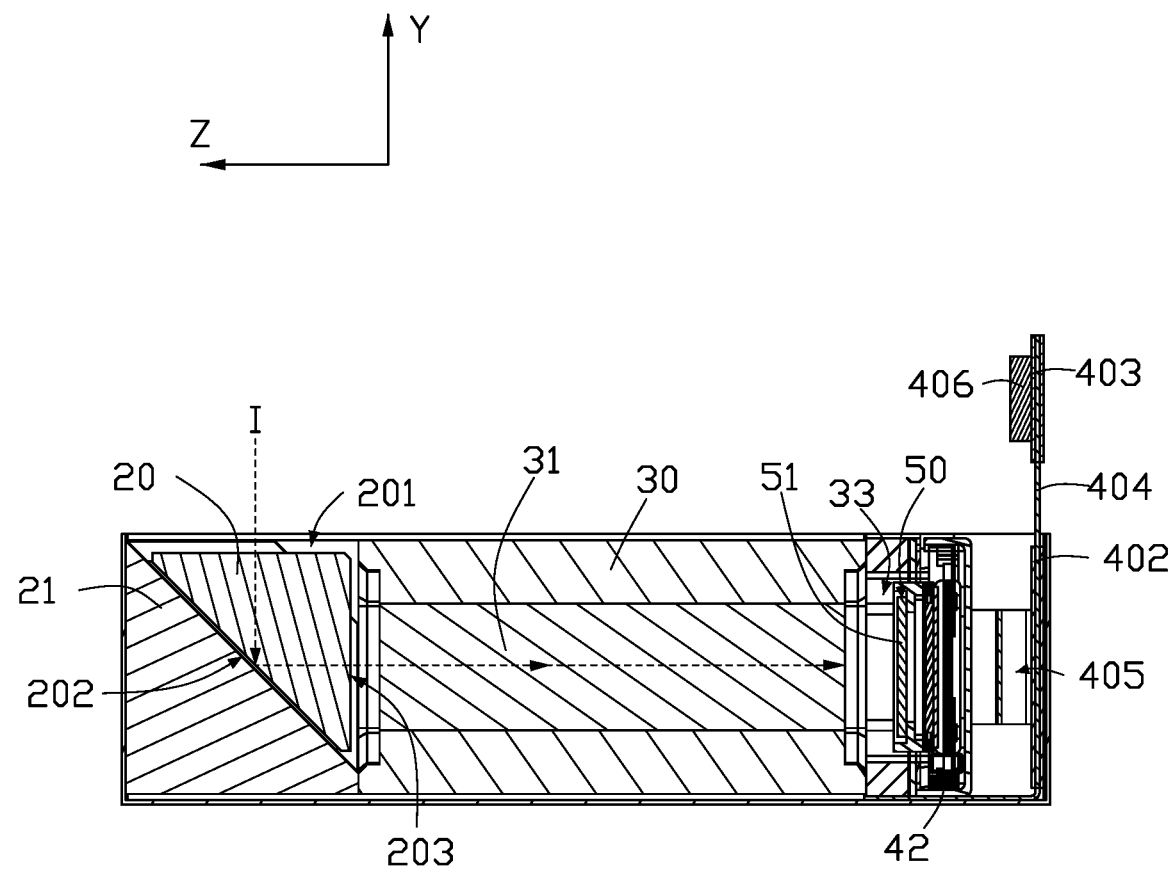
FIG. 9 is a cross-sectional view along line IX-IX of FIG. 1.

Referring to FIGS. 2 and 9, in this embodiment, the reflecting assembly 2 includes a reflecting member 20 and a first actuator 21. The first actuator 21 is connected to the reflecting member 20. The first actuator 21 drives the reflecting member 20 to rotate around the third direction X, so that light rays from different directions can be reflected into the lens assembly 2. Specifically, the reflecting member 20 can be a prism or a reflecting mirror. The first actuator 21 can be a stepping motor, a voice coil motor, a piezoelectric motor, or a micro-electromechanical system.

Referring to FIGS. 2 and 9, in this embodiment, the reflecting member 20 is a prism, and the reflecting member 20 includes a first surface 201, a second surface 202, and a third surface 203. The first surface 201, the second surface 202, and the third surface 203 are connected to form a triangular-shaped prism. The first surface 201 and the third surface 203 are perpendicular to each other. The second surface 203 intersects with the first surface 201 or the third surface 203 to form an included angle of 45 degrees. The first surface 201 faces an object to be captured. The third surface 203 faces the lens assembly 3, and the second surface 203 reflects the light rays. The reflecting member 20 may be made of glass or transparent plastics.

Referring to FIGS. 2 and 9, in this embodiment, the lens assembly 3 includes a lens member 30, a second actuator 31, and a support frame 33. The lens member 30 is disposed within the second actuator 31. An end of the second actuator 31 is connected to the reflecting assembly 2. Opposite end of the second actuator 31 is connected to the support frame 33. The second actuator 31 defines a receiving hole 32 that extends along the first direction Z. The lens member 30 is disposed within the receiving hole 32. The support frame 33 is substantially rectangular. The support frame 33 is used for supporting the second actuator 31 and the light sensing assembly 4. The second actuator 31 is used for driving the lens member 30 to move along the first direction Z to realize an auto-focusing function. The lens member 30 has a fixed focal length. The second actuator 31 can be a stepping motor, a voice coil motor, a piezoelectric motor, or a micro-electromechanical system.

Figure 3:
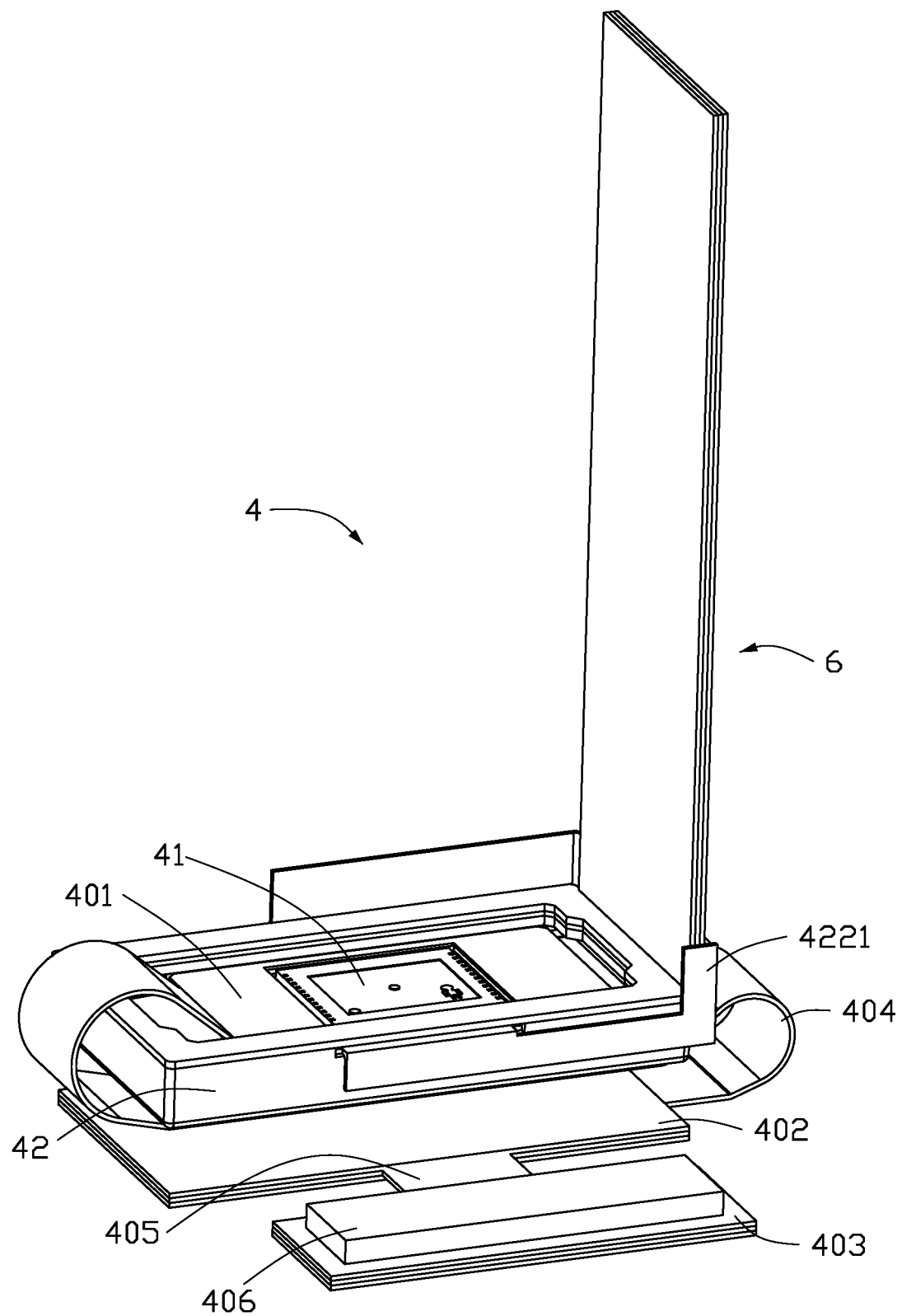
FIG. 3 is a diagrammatic view of the fast-focusing zoom camera module of FIG. 1, with a reflecting assembly and a lens assembly removed.

Referring to FIGS. 2 and 3, the light sensing assembly 4 includes a first circuit board 40, a sensor 41, a third actuator 42, and a supporting plate 43.

Referring to FIGS. 2 and 3, the first circuit board 40 is a rigid-flex board. The first circuit board 40 includes a first rigid portion 401, a second rigid portion 402, a third rigid portion 403, a first flexible portion 404, a second flexible portion 405, and a connector 406. The first rigid portion 401 faces the second rigid portion 402. The first flexible portion 404 is connected between the first rigid portion 401 and the second rigid portion 402. The first flexible portion 404 turns back on itself through 180 degrees. The second flexible portion 405 is connected between the second rigid portion 402 and the third rigid portion 403. The second flexible portion 405 and the first flexible portion 405 are staggered from each other. The connector 406 is disposed on a surface of the third rigid portion 403. The connector 406 is used for connecting another component, such as a mainboard.

The first rigid portion 401 faces the lens assembly 3. The first rigid portion 401 defines a through hole 4011. The sensor 41 is disposed within the through hole 4011. The sensor 41 is electrically connected to the first rigid portion 401 by gold wires (not shown). The sensor 41 faces the lens member 30. The supporting plate 43 is disposed on a surface of the first rigid portion 401 that is opposite to the lens assembly 3. The supporting plate 43 covers the through hole 4011 and is attached to the sensor 41. The supporting plate 43 reinforces structural strength of the first rigid portion 401 and can dissipate heat generated by the sensor 41. Specifically, the sensor 41 can be a complementary metal oxide semiconductor or a charge-coupled device.

Figure 4:
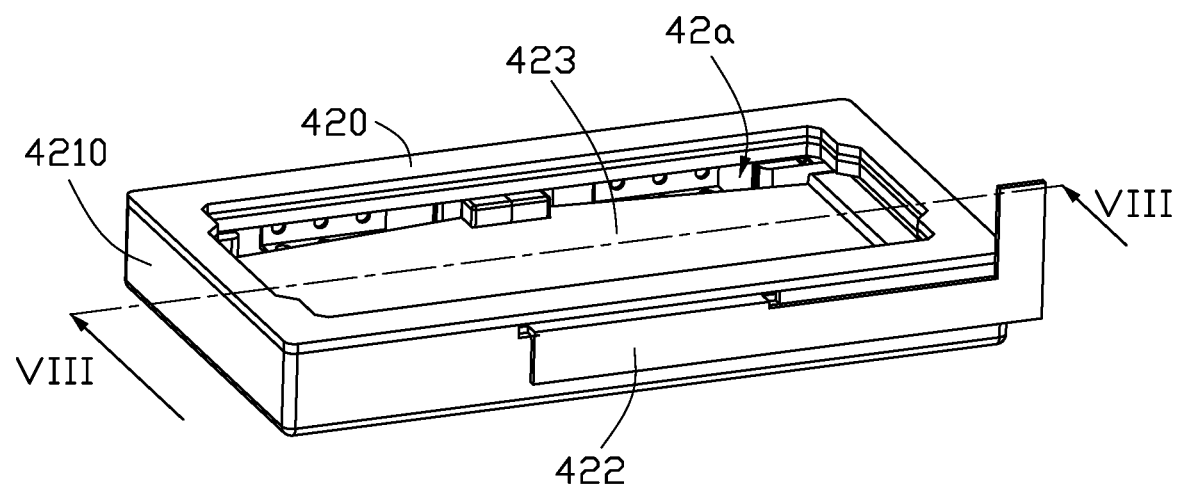
FIG. 4 is a diagrammatic view of a third actuator of a periscope-type zooming camera of FIG. 1.
Figure 8:
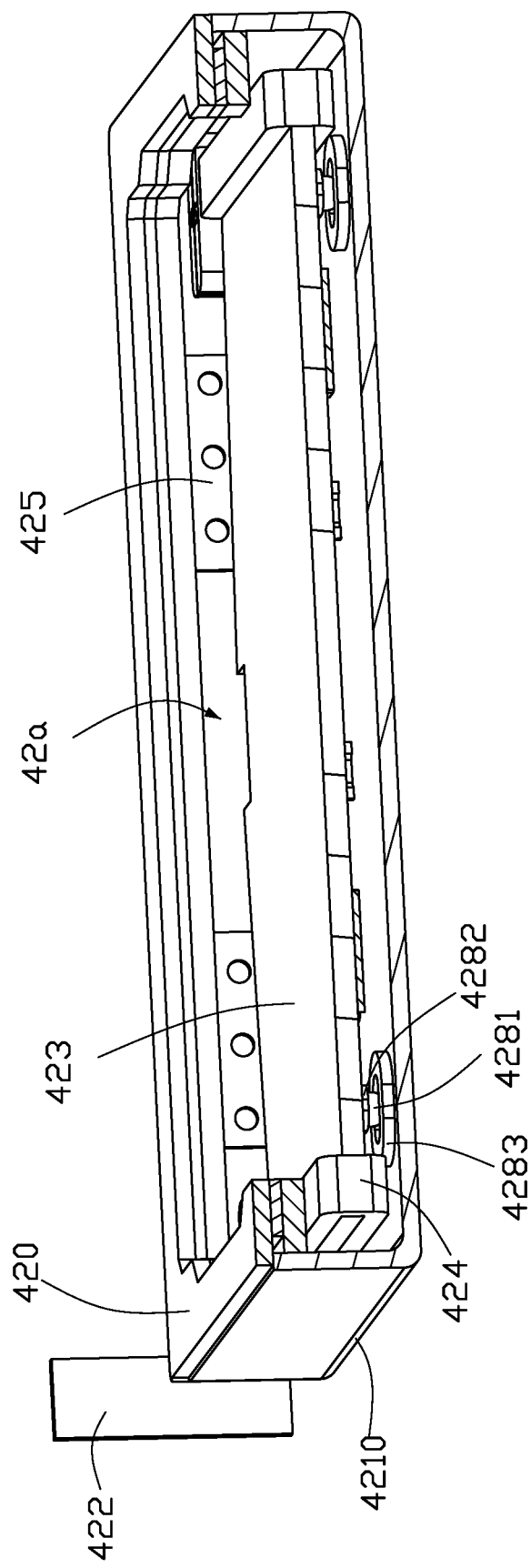
FIG. 8 is a cross-sectional view along line VIII-VIII of FIG. 4.

Referring to FIGS. 4 and 8, the third actuator 42 includes a cover plate 420, a second circuit board 422, a holding plate 423, at least one coil 424, a detector 426, a sliding member 428, at least one first magnetic member 429, and a bottom casing 4210. The cover plate 420 and the bottom casing 4210 cooperatively define a receiving space 42a. The second circuit board 422, the holding plate 423, the coil 424, the detector 426, the sliding member 428, and the first magnetic member 429 are disposed within the receiving space 42a.

The coil 424 is a hollow ring and generates a magnetic field. In this embodiment, the number of coils 424 is two, and the two coils 424 are sleeved at both ends of the holding plate 423.

The bottom casing 4210 includes a bottom plate 4210a and a plurality of side plates 4210b. The side plates 4310b connect to the bottom plate 4210 to form the receiving space 42a.

Figure 5:
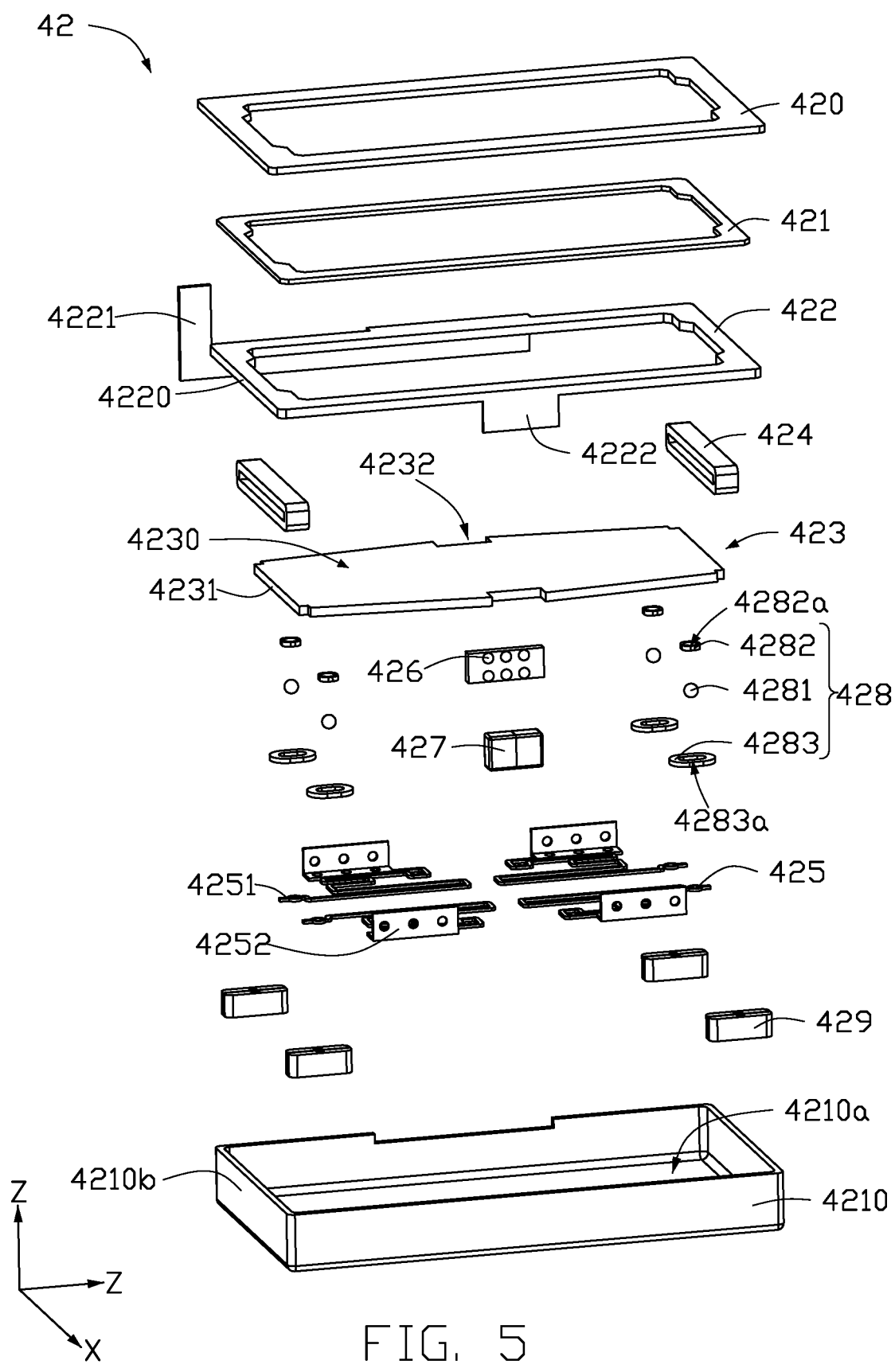
FIG. 5 is an exploded view of the third actuator of FIG. 4.
Figure 7:
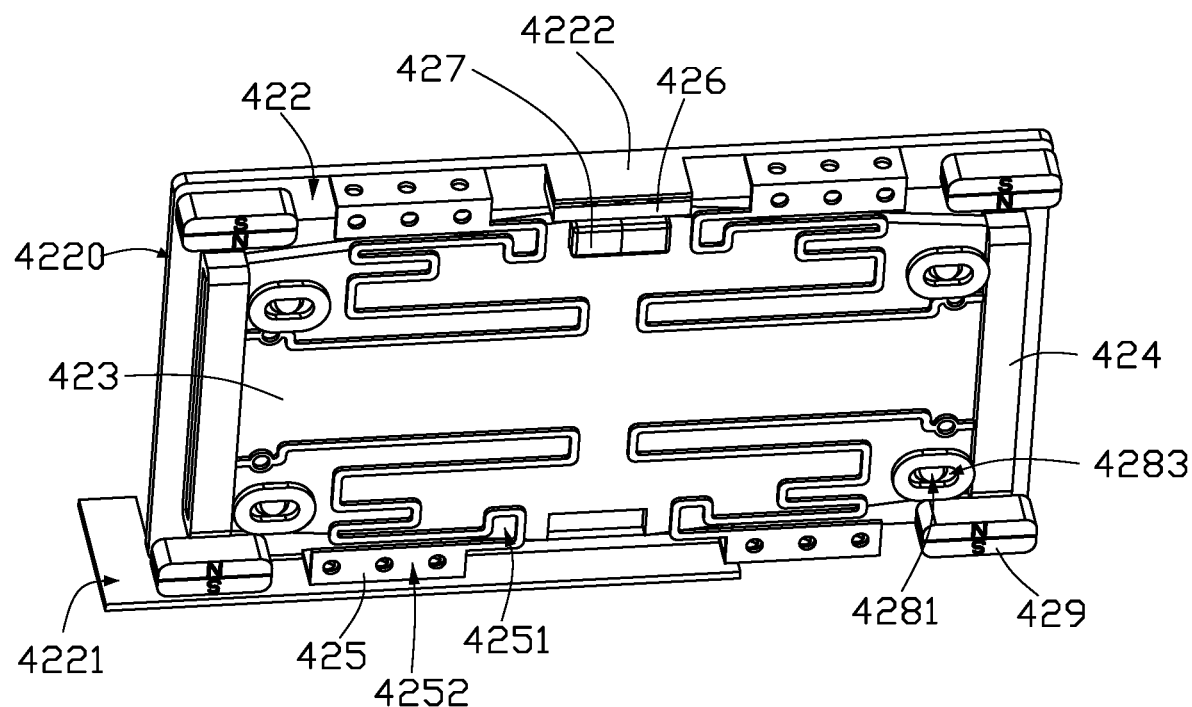
FIG. 7 is a diagrammatic view of the third actuator of FIG. 4, with the bottom casing removed.

Referring to FIGS. 5 and 7, the holding plate 423 includes a fourth surface 4230 and a fifth surface 4231 opposite to the fourth surface 4230. The fourth surface 4230 faces the cover plate 420. The fifth surface 4231 faces the bottom casing 4210. The third actuator 42 further includes a plurality of elastic members 425. Each elastic member 425 is connected to the fifth surface 4231. Each elastic member 425 includes a first elastic portion 4251 and a second elastic portion 4252. The first elastic portion 4251 connects with the coil 424. The second elastic portion 4252 connects with the second circuit board 422. In this embodiment, there are four elastic members 425. Each of the coils 424 is connected between two elastic members 425 to achieve an electrical connection between the second circuit board 422 and the coil 424. The second circuit board 422 feeds an electric current to the coil 424, so that the coil 424 can produce a magnetic field.

Figure 6:
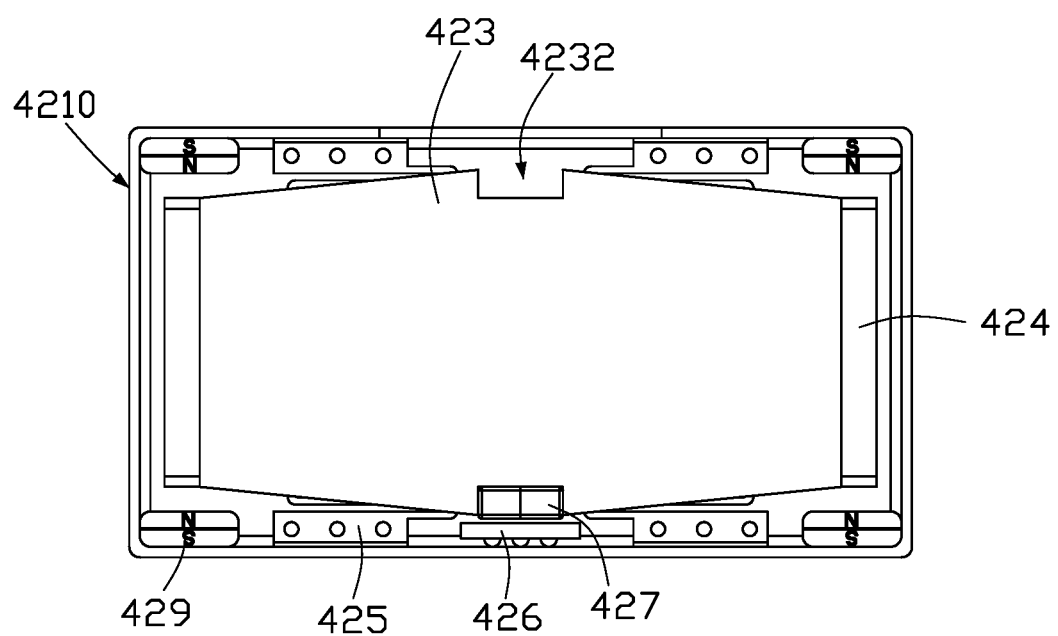
FIG. 6 is a bottom view of the third actuator of FIG. 4, with a bottom casing and an elastic member removed.

Referring to FIGS. 5 and 6, the third actuator 42 further includes a second magnetic member 427. The holding plate 423 defines an opening 4232. The opening 4232 penetrates the fourth surface 4230 and the fifth surface 4231. The second magnetic member 427 is disposed within the opening 4232. The detector 426 is electrically connected to the second circuit board 422. The detector 426 faces the second magnetic member 427. The detector 426 is used for detecting tremors and movement of the second magnetic member 427. Specifically, the detector 426 can be an accelerometer, a gyroscope, or a magnetometer.

Figure 10:
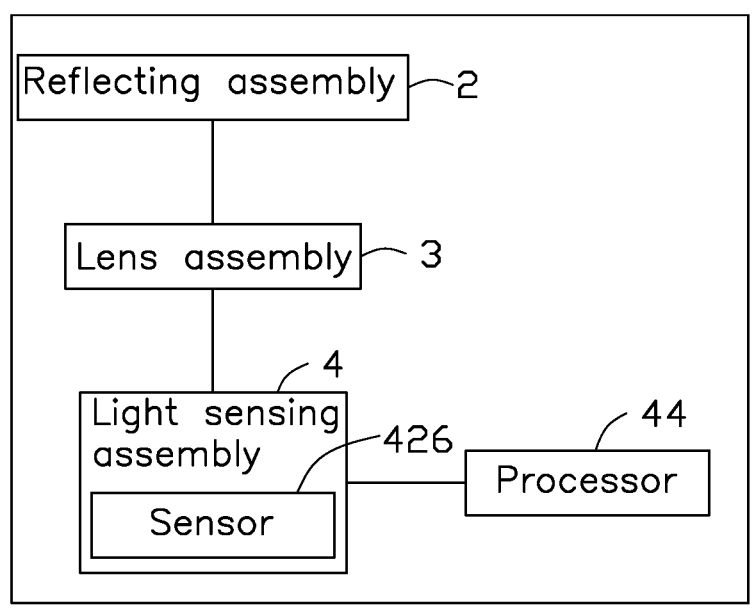
FIG. 10 is a block view of the periscope-type zooming camera of FIG. 1.

Referring to FIG. 10, the second circuit board 422 is disposed between the holding plate 423 and the cover plate 420. The second circuit board 422 includes a main portion 4220, an extending portion 4221, and a connecting portion 4222. The main portion 4220 is substantially a hollow frame. A corner of the main portion 4220 extends along the first direction Z to form the extending portion 4221, and the extending portion 4221 is substantially L-shaped. A middle part of a side of the main portion 4220 extends opposite to the first direction Z to form the connecting portion 4222. The connecting portion 4222 faces away from the extending portion 4221. The main portion 4220 is electrically connected to the elastic member 425. The extending portion 4221 is electrically connected to the first actuator 21 and the second actuator 31. The connecting portion 4222 is electrically connected to the detector 426.

Referring to FIGS. 5, 7, and 8, the sliding member 428 is disposed on the fifth surface 4231. The sliding member 428 includes a rolling ball 4281, a fixing member 4282, and a guiding member 4283. The fixing member 4282 is fixed on the holding plate 423. The fixing member 4282 defines a first receiving groove 4282a. The guiding member 4283 is fixed on the bottom casing 4210. The guiding member 4238 defines a second receiving groove 4283a. a first portion of the rolling ball 4281 is rotatably arranged in the first receiving groove 4282a, and a second portion of the rolling ball 4281 is rotatably arranged in the second receiving groove 4283a. The second receiving groove 4283a extends along the third direction X. The first magnetic member 429 is disposed on the bottom plate 4210a. In this embodiment, there are four first magnetic members 429, arranged around the bottom plate 4210a.

Referring to FIG. 3, a surface of the supporting plate 43 facing away from the first rigid portion 401 is connected to the fourth surface 4230. The first rigid portion 401, the sensor 41, and the holding plate 423 are disposed inside the receiving space 42a.

The camera module 100 further includes a processor 44. The processor 44 is electrically connected to the detector 426. The detector 426 is used for calculating an offset value used by the circuit board 422 when applying electric current to the coil 424. When the holding plate 423 moves along the second direction Y and deviates from its original position aimed at the sensor 41, the second magnetic member 427 is driven to move along the second direction Y. The detector 426 may obtain a set of motion data of the second magnetic member 427 and transmits the set of motion data to the processor 44. The processor 44 calculates an offset value based on the set of motion data. An electric current (not shown) based on the offset value is supplied to the coil 424. A Lorentz force is generated between the coil 424 and the first magnetic member 429, and the Lorentz force drives the holding plate 423 to move a distance along the second direction Y, thereby bringing the sensor 41 back to its original position aimed at the sensor 41, to achieve optical image stabilization.

In the present disclosure, the first actuator 21 drives the reflecting assembly 2 to rotate around the second direction Y, the second actuator 31 drives the lens assembly 3 to move along the first direction Z, and the third actuator 42 drives the light sensing assembly 4 to move along the third direction X. Each of the single-direction actuators (the first actuator 21, the second actuator 31, and the third actuator 42) drives its load (the reflecting assembly 2, the lens assembly 3, and the light sensing assembly 4) to move only in one direction, allowing the camera module 100 to rapidly focus or to stabilize the imaging. Meanwhile, the camera module 100 can be designed with reduced cost, as the single-direction actuators used in the present disclosure are less costly than actuators which can drive loads in multiple directions.

Referring to FIGS. 2 and 3, the camera module 100 further includes a light filtering assembly 5 disposed between the support frame 33 and the first rigid portion 401. The light filtering assembly 5 includes a supporting base 50 and a filter 51. The supporting base 50 defines a through hole 52 facing the receiving hole 32. The supporting base 50 includes a sixth surface 501 and a seventh surface 502 opposite to the sixth surface 501. The sixth surface 501 faces the lens assembly 3. The seventh surface 502 is connected to the first rigid portion 401. The sixth surface 501 defines an opening 53, and the opening 53 faces the sensor 41 and the lens assembly 3. The filter 51 is disposed within the opening 51. The filter 51 is used for filtering out undesired light such as infrared light. Specifically, the filter 51 may be an infrared cut-off filter.

Referring to FIGS. 2 and 3, the camera module 100 further includes a third circuit board 6. The third circuit board 6 is in a rectangular shape. The third circuit board 6 is connected to the first actuator 21, the second actuator 31, and the third actuator 42. The third circuit board 6 transmits electricity to the first actuator 21, the second actuator 31, and the third actuator 42.

Figure 11:
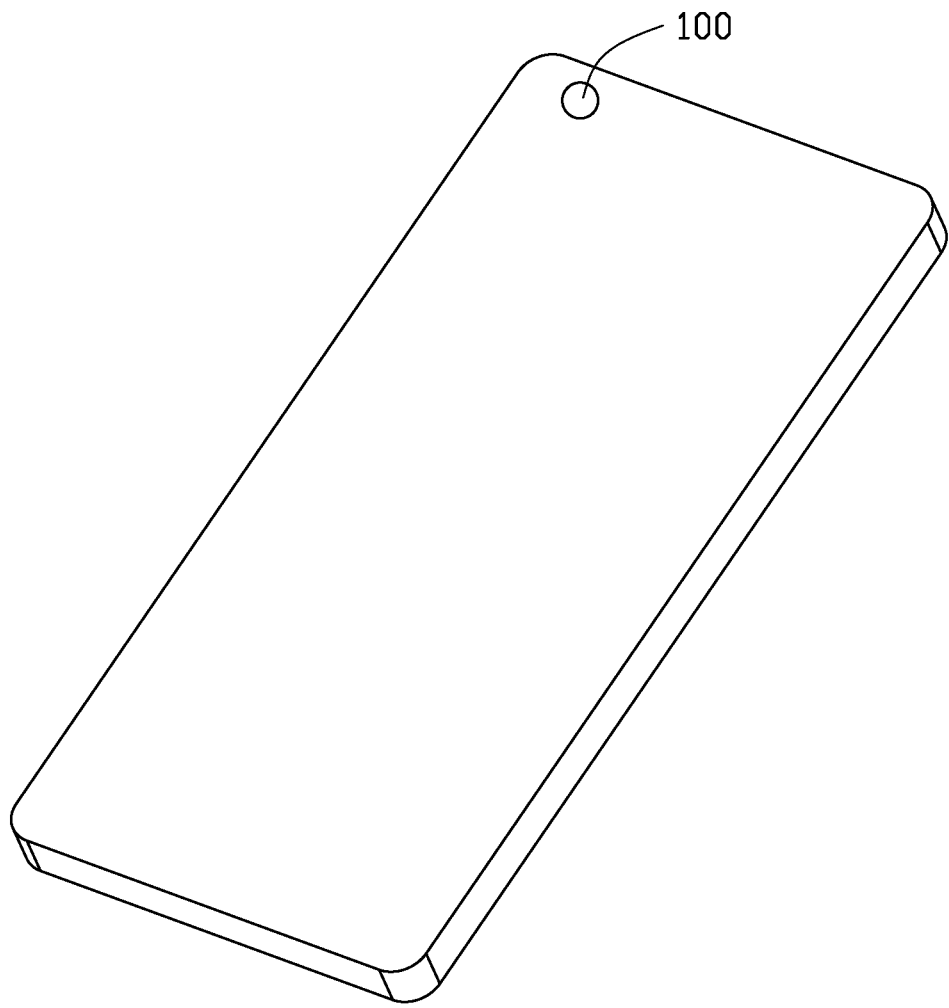
FIG. 11 is a diagrammatic view of an electronic device according to an embodiment of the present disclosure.

Referring to FIG. 11, an embodiment of an electronic device 200 is provided. The electronic device 200 includes the camera module 100. The electronic device 200 may be a smartphone, an IPAD, a smartwatch, or a drone.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A fast-focusing zoom camera module for periscope use, comprising:
   a reflecting assembly;
   a light sensing assembly; and
   a lens assembly arranged between the reflecting assembly and the light sensing assembly,
   wherein the lens assembly comprises a lens member and a second actuator, the second actuator is configured to drive the lens member to move along a first direction;
   the reflecting assembly comprises a reflecting member and a first actuator, the first actuator is configured to drive the reflecting member to rotate around an axis defined by a second direction perpendicular to the first direction,
   the light sensing assembly comprises a first circuit board, a sensor, and a third actuator, the sensor is electrically connected to the first circuit board, the third actuator is configured to drive the sensor to move along a third direction perpendicular to the first direction and the second direction;
   wherein the first circuit board comprises a first rigid portion, a second rigid portion, a third rigid portion, a first flexible portion, and a second flexible portion, the first flexible portion is connected between the first rigid portion and the second rigid portion, the second flexible portion is connected between the second rigid portion and the third rigid portion,
   wherein the first rigid portion faces the lens assembly, the sensor is arranged on a surface of the first rigid portion; and
   wherein the third actuator is arranged on another surface of the first rigid portion opposite to the sensor;
   wherein the third actuator comprises a cover plate, a holding plate, a second circuit board, and a bottom casing, the cover plate is arranged on the bottom casing to cooperatively define a receiving space, the holding plate is movably disposed inside the receiving space, the second circuit board is arranged between the cover plate and the holding plate;
   wherein the third actuator comprises a coil, an elastic member, and a plurality of first magnetic members, the coil is sleeved around the holding plate, an end of the elastic member is arranged on a surface of the second rigid portion, another end of the elastic member is connected to the coil, the plurality of first magnetic members is disposed inside the bottom casing, the plurality of first magnetic members is arranged around the coil.

2. The fast-focusing zoom camera module of claim 1, wherein the third actuator further comprises a sliding member, the sliding member comprises a rolling ball, a fixing member, and a guiding member, the fixing member is fixed on the holding plate, the fixing member defines a first receiving groove, the guiding member is fixed on the bottom casing, the fixing member defines a second receiving groove, the second receiving groove extends along the third direction, a first portion of the rolling ball is rotatably arranged in the first receiving groove, a second portion of the rolling ball is rotatably arranged in the second receiving groove.

3. The fast-focusing zoom camera module of claim 1, wherein the first circuit board further comprises a supporting plate, the supporting plate is connected between the holding plate and the first rigid portion, the first rigid portion defines a through hole, the sensor is disposed within the through hole and connected to the supporting plate.

4. The fast-focusing zoom camera module of claim 1, wherein the third actuator further comprises a detector, a second magnetic member, and a processor, the second magnetic member is arranged on the holding plate, the detector is disposed within the bottom casing, the processor is electrically connected between the detector and the second circuit board, the detector is configured to obtain a set of motion data of the second magnetic member, the processor is configured to calculate an offset value based on the set of motion data and control the second circuit board to supply an electric current to the coil based on the offset value.

5. The fast-focusing zoom camera module of claim 1, wherein the second actuator defines a receiving hole, the lens assembly is movably disposed inside the receiving hole along the first direction, the lens assembly faces the reflecting member and the sensor.

6. The fast-focusing zoom camera module of claim 1, further comprising a third circuit board, wherein the third circuit board is electrically connected to the first actuator, the second actuator, and the third actuator.

7. The fast-focusing zoom camera module of claim 1, further comprising a filtering assembly, wherein the filtering assembly is disposed between the lens assembly and the sensor.

8. An electronic device, comprising a fast-focusing zoom camera module, the fast-focusing zoom camera module comprising:
   a reflecting assembly;
   a light sensing assembly; and
   a lens assembly arranged between the reflecting assembly and the light sensing assembly,
   wherein the lens assembly comprises a lens member and a second actuator, the second actuator is configured to drive the lens member to move along a first direction;
   the reflecting assembly comprises a reflecting member and a first actuator, the first actuator is configured to drive the reflecting member to rotate around an axis defined by a second direction perpendicular to the first direction,
   the light sensing assembly comprises a first circuit board, a sensor, and a third actuator, the sensor is electrically connected to the first circuit board, the third actuator is configured to drive the sensor to move along a third direction perpendicular to the first direction and the second direction;
   wherein the first circuit board comprises a first rigid portion, a second rigid portion, a third rigid portion, a first flexible portion, and a second flexible portion, the first flexible portion is connected between the first rigid portion and the second rigid portion, the second flexible portion is connected between the second rigid portion and the third rigid portion, the first rigid portion faces the lens assembly, the sensor is arranged on a surface of the first rigid portion;
   the third actuator is arranged on another surface of the first rigid portion opposite to the sensor;
   wherein the third actuator comprises a cover plate, a holding plate, a second circuit board, and a bottom casing, the cover plate is arranged on the bottom casing to cooperatively define a receiving space, the holding plate is movably disposed inside the receiving space, the second circuit board is arranged between the cover plate and the holding plate;
   wherein the third actuator comprises a coil, an elastic member, and a plurality of first magnetic members, the coil is sleeved around the holding plate, an end of the elastic member is arranged on a surface of the second rigid portion, another end of the elastic member is connected to the coil, the plurality of first magnetic members is disposed inside the bottom casing, the plurality of first magnetic members is arranged around the coil.

9. The electronic device of claim 8, wherein the third actuator further comprises a sliding member, the sliding member comprises a rolling ball, a fixing member, and a guiding member, the fixing member is fixed on the holding plate, the fixing member defines a first receiving groove, the guiding member is fixed on the bottom casing, the fixing member defines a second receiving groove, the second receiving groove extends along the third direction, a first portion of the rolling ball is rotatably arranged in the first receiving groove, a second portion of the rolling ball is rotatably arranged in the second receiving groove.

10. The electronic device of claim 8, wherein the first circuit board further comprises a supporting plate, the supporting plate is connected between the holding plate and the first rigid portion, the first rigid portion defines a through hole, the sensor is disposed within the through hole and connected to the supporting plate.

11. The electronic device of claim 8, wherein the third actuator further comprises a detector, a second magnetic member, and a processor, the second magnetic member is arranged on the holding plate, the detector is disposed within the bottom casing, the processor is electrically connected between the detector and the second circuit board, the detector is configured to obtain a set of motion data of the second magnetic member, the processor is configured to calculate an offset value based on the set of motion data and control the second circuit board to supply an electric current to the coil based on the offset value.

12. The electronic device of claim 8, wherein the second actuator defines a receiving hole, the lens assembly is movably disposed inside the receiving hole along the first direction, the lens assembly faces the reflecting member and the sensor.

13. The electronic device of claim 8, further comprising a third circuit board, wherein the third circuit board is electrically connected to the first actuator, the second actuator, and the third actuator.

14. The electronic device of claim 8, further comprising a filtering assembly, wherein the filtering assembly is disposed between the lens assembly and the sensor.

* * * * *